US008892069B2

(12) United States Patent
Godin et al.

(10) Patent No.: US 8,892,069 B2
(45) Date of Patent: Nov. 18, 2014

(54) METHOD FOR AUTOMATICALLY CONFIGURING ADDRESSES AND/OR SECURITY DATA BETWEEN EVOLVED NODE BS (ENBS) OF A LONG TERM EVOLUTION (LTE) ACCESS NETWORK, AND ASSOCIATED MOBILITY MANAGEMENT ENTITIES (MME) AND EVOLVED NODE B (ENB)

(75) Inventors: Philippe Godin, Velizy (FR); Christophe Demarez, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 664 days.

(21) Appl. No.: 12/536,268

(22) Filed: Aug. 5, 2009

(65) Prior Publication Data
US 2010/0039991 A1 Feb. 18, 2010

(30) Foreign Application Priority Data
Aug. 6, 2008 (EP) .................................. 08305452

(51) Int. Cl.
| H04M 1/66 | (2006.01) |
| H04W 24/02 | (2009.01) |
| H04W 88/08 | (2009.01) |
| H04W 92/20 | (2009.01) |
| H04W 8/26 | (2009.01) |
| H04L 29/06 | (2006.01) |
| H04L 29/12 | (2006.01) |
| H04W 76/02 | (2009.01) |
| H04W 84/04 | (2009.01) |

(52) U.S. Cl.
CPC .............. *H04W 24/02* (2013.01); *H04W 88/08* (2013.01); *H04W 92/20* (2013.01); *H04W 8/26* (2013.01); *H04L 63/062* (2013.01); *H04L 61/103* (2013.01); *H04W 76/02* (2013.01); *H04W 8/265* (2013.01); *H04L 61/6095* (2013.01); *H04W 84/047* (2013.01)
USPC ........ 455/410; 455/411; 455/422.1; 455/436; 455/435.1; 455/438; 370/254; 370/331

(58) Field of Classification Search
USPC .............. 455/410–411, 422.1, 436, 524, 561, 455/435.1, 438; 370/254, 331
See application file for complete search history.

(56) References Cited

U.S. PATENT DOCUMENTS 8,024,000 B2 * 9/2011 Wang et al. .................. 455/561
2006/0264215 A1 * 11/2006 Ekstedt et al. ............. 455/435.2
(Continued)

FOREIGN PATENT DOCUMENTS

WO WO 2008/042414 A2 4/2008
WO WO 2008/082587 A1 7/2008

OTHER PUBLICATIONS

Ericsson, PCT/SE2008/050575 filing date May 15, 2008. Checked with link: http://www.wipo.int/patentscope/search/en/search.jsf.*

(Continued)

*Primary Examiner* — Kashif Siddiqui
*Assistant Examiner* — Mong-Thuy Tran
(74) *Attorney, Agent, or Firm* — Fay Sharpe LLP

(57) ABSTRACT

A method is intended for automatically configuring address(es) between eNBs (NBi) of an LTE access network. This method comprises i) transmitting a chosen message to at least one Mobility Management Entity (MME) of a core network connected to the LTE access network, this chosen message including at least one transport layer address of a first eNB (NB1) and/or authentication and/or security data of this first eNB (NB1) for connection to the latter, and ii) relaying within a downlink message an identifier of this first eNB (NB1) and the at least one transport layer address and/or the authentication and/or security data for the connection of this first eNB (NB1) to a set of at least one chosen eNB (NBi).

23 Claims, 1 Drawing Sheet

(56) References Cited

U.S. PATENT DOCUMENTS

| | | | |
|---|---|---|---|
| 2007/0213060 A1* | 9/2007 | Shaheen | 455/436 |
| 2008/0025263 A1* | 1/2008 | Pelkonen | 370/332 |
| 2008/0080399 A1* | 4/2008 | Wang et al. | 370/254 |
| 2008/0098467 A1* | 4/2008 | Miller et al. | 726/5 |
| 2008/0233974 A1* | 9/2008 | Xu | 455/458 |
| 2008/0259876 A1* | 10/2008 | Qiang et al. | 370/332 |
| 2008/0310378 A1* | 12/2008 | Kitazoe et al. | 370/338 |
| 2008/0313300 A1* | 12/2008 | Alanara et al. | 709/208 |
| 2009/0047955 A1* | 2/2009 | Frenger et al. | 455/436 |
| 2009/0047956 A1* | 2/2009 | Moe et al. | 455/436 |
| 2009/0129342 A1* | 5/2009 | Hwang et al. | 370/331 |
| 2009/0147744 A1* | 6/2009 | Dottling et al. | 370/329 |
| 2009/0176513 A1* | 7/2009 | Bosch et al. | 455/458 |
| 2009/0258631 A1* | 10/2009 | Forsberg et al. | 455/411 |
| 2009/0305699 A1* | 12/2009 | Deshpande et al. | 455/434 |
| 2010/0061308 A1* | 3/2010 | Becker et al. | 370/328 |
| 2010/0178920 A1* | 7/2010 | Kitazoe et al. | 455/436 |
| 2010/0195621 A1* | 8/2010 | Kekki et al. | 370/332 |
| 2010/0202402 A1* | 8/2010 | Dalsgaard et al. | 370/331 |
| 2010/0226267 A1* | 9/2010 | Jang et al. | 370/252 |
| 2010/0330959 A1* | 12/2010 | Mildh et al. | 455/410 |
| 2011/0116629 A1* | 5/2011 | Forsberg et al. | 380/44 |

OTHER PUBLICATIONS

Ericsson, "X2 NRL Self-Configuration," 3GPP TSG-RAN WG3 #60, R3-081462, XP002515357, 1 page, May 5, 2008.

Nortel, "ANR Neighbors IP Address Lookup and Establishment," 3GPP TSG-RAN Wg3, Meeting #60, R3-081226, XP002515358, 5 pages, May 5, 2008.

Alcatel Lucent, "Self-Configuration of Transport Layer Addresses," 3GPP TSG RAN3#61, R3-081851, XP002515359, 3 pages, Aug. 18, 2008.

Qualcomm Europe, "Discovery of Neighbor eNB IP Address," 3GPP TSG-RAN WG3 #61, R3-081821, XP002515360, 5 pages, Aug. 18, 2008.

European Search Report.

* cited by examiner

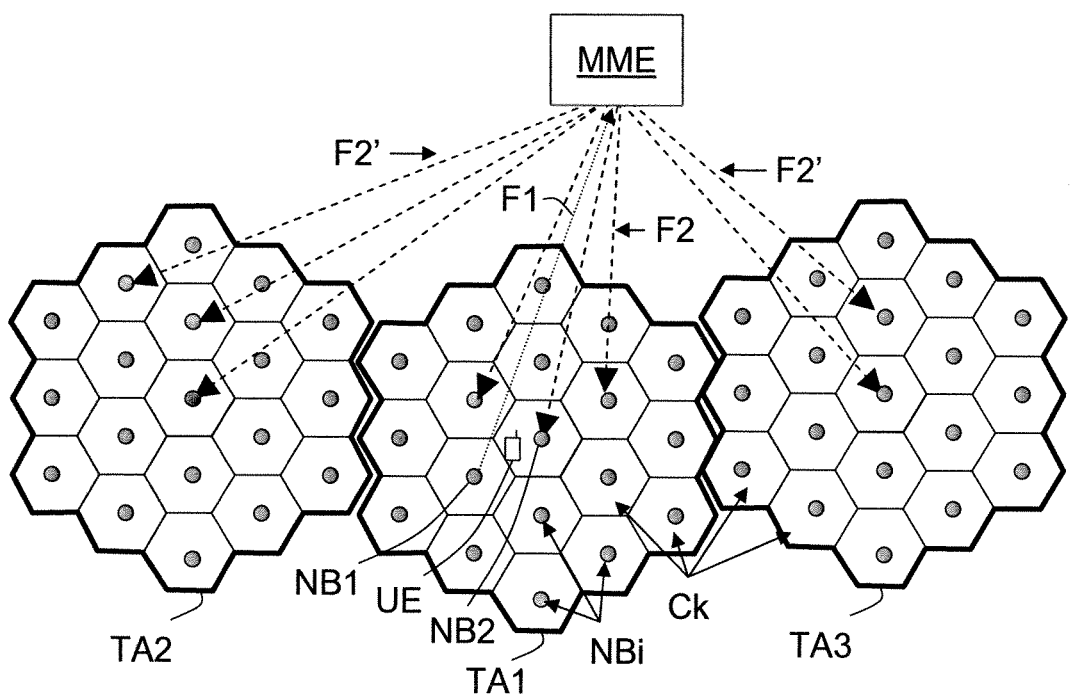

METHOD FOR AUTOMATICALLY CONFIGURING ADDRESSES AND/OR SECURITY DATA BETWEEN EVOLVED NODE BS (ENBS) OF A LONG TERM EVOLUTION (LTE) ACCESS NETWORK, AND ASSOCIATED MOBILITY MANAGEMENT ENTITIES (MME) AND EVOLVED NODE B (ENB)

FIELD OF THE INVENTION

The present invention relates to LTE ("Long Term Evolution") access networks, and more precisely to address configuration within LTE access networks.

BACKGROUND OF THE INVENTION

One means here by "LTE access network" the E-UTRAN ("Evolved Universal Terrestrial Radio Access Network"), which is an evolution of the UMTS ("Universal Mobile Telecommunications System") radio access network towards a high data rate, low latency and packet optimized radio access network, currently specified by the 3GPP ("3$^{rd}$ Generation Partnership Project"), notably in 3GPP Technical Specification 36.300. As described in this Technical Specification 36.300, the E-UTRAN comprises base stations called eNBs ("evolved Node Bs" or "E-UTRAN Node Bs"). In the control plane, each eNB comprises a S1 interface which is connected to one or several Mobility Management Entities (or MMEs) that belong to a core network called EPC ("Evolved Packet Core"). An eNB is connected to all the MMEs controlling the pool area(s) it serves. A MME is connected to all the eNBs serving a pool area controlled by a MME pool it belongs to. Moreover in a pool area one MME may be designated as master.

As it is known by the man skilled in the art, it has been proposed to introduce a new function related to SON ("Self-Optimizing Networks") in LTE access networks. This new function is called ANRF ("Automatic Neighbour Relation Function"). It applies when a User Equipment (or UE) informs the eNB to which it is connected, that it has detected a new neighbouring cell. It is recalled that an eNB controls at least one cell (associated to a cell identifier (called "global cell identifier")), that each eNB belongs to at least one tracking area identified by a code called TAC ("Tracking Area Code", which is generally a part of a tracking area identifier) and that eNBs may be connected therebetween through X2 connections.

According to ANRF, upon detection and reporting of a new neighbouring cell to a serving eNB, this eNB can ask a user equipment (or UE) to further read, decode and report what is the global cell id of this new neighbouring cell. When this eNB receives the global cell id, it has to derive from the global cell id at least one transport layer address (or TLA) that will enable it to try to dynamically setup an X2 connection with the eNB that controls the corresponding new detected cell.

In order to derive a transport layer address (or TLA) from a global cell id, an eNB must access either a central server of the DNS ("Domain Name Server") type or a local database that is supposed to have been previously populated by an O&M configuration (which is known to be dull and subject to errors). So, the current ANRF function is not fully automated.

At least two proposals have been made to automate the retrieval of the transport layer addresses.

A first proposal consists in constructing standardized Fully Qualified Domain Names (or FQDN) based on global cell ids in order to resolve the IP addresses by a standardized DNS look-up. However, this proposal has not been retained by 3GPP so far because it puts too much constraint on the global cell ids. Indeed, it requires definition of standardized cross-domain FQDN and associated building rules.

A second proposal consists of using classical vendor DNS look-ups but requires coordination effort to populate and coordinate inter-vendor DNSs and proprietary look-up implementations in order to be able to look-up a global cell id that is unknown in an initial node domain.

Moreover, establishment of X2 connections only based on global cell ids may induce security problems.

SUMMARY

A method intended for configuring the address between eNBs of an LTE access network is provided. The method is applicable in multi-vendor LTE networks. Such a method comprises:
transmitting a chosen message to at least one Mobility Management Entity (MME) of an EPC connected to the LTE access network, this chosen message including at least one transport layer address (or TLA) of a first eNB and/or authentication and/or security data of this first eNB for connection to the latter, and
relaying within a downlink message an identifier of this first eNB and this at least one transport layer address and/or these authentication and/or security data for the connection of this first eNB to a set of at least one chosen eNB.

Further embodiments of the method according to the invention may include additional characteristics considered separately or combined, and notably:
the chosen message may be a setup request message;
  the setup request message may be a S1 SETUP REQUEST message (defined by the S1 Application Protocol (or S1AP)) originating from the first eNB;
  in a variant, the chosen message may be a dedicated (uplink) message transmitted by the first eNB, possibly after transmission of a S1 SETUP REQUEST message, and possibly defined by S1AP;
the at least one transport layer address and/or the authentication and/or security data may be for X2 establishment of connection to the first eNB;
the downlink message may be a MME CONFIGURATION UPDATE message, or a S1 SETUP RESPONSE message towards eNBs that are not connected to the MME at the time the uplink chosen message is received, and which are eligible for being part of the set of chosen eNB(s) when they initiate the S1 Setup procedure towards the MME, or else a dedicated downlink information transfer message (possibly defined by S1AP);
the set of chosen eNB(s) may include at least one eNB that belongs to a tracking area to which also belongs the first eNB;
the set of chosen eNB(s) may further include at least one eNB that belongs to at least one other tracking area (and up to possibly the full pool area that is served by the first eNB);
when a second eNB has received a (global) cell identifier representative of a new cell controlled by the first eNB from a user equipment, this second eNB may apply a fixed mask on this received (global) cell identifier to determine the identifier of this first eNB (possibly in its tracking area) and then initiate a connection establishment with this first eNB by means of transport layer address(es) and/or authentication and/or security data contained into a received downlink message comprising the determined identifier of this first eNB;

in a variant, the chosen message may further include a list of identifiers of cells that are controlled by the first eNB. In this case the method may further comprise relaying within the downlink message the list of cell identifiers to the set of chosen eNB(s), and when a second eNB has received a cell identifier representative of a new cell controlled by the first eNB from a user equipment, this second eNB may determine amongst received downlink messages the one comprising the received cell identifier and then initiate a connection establishment with the corresponding first eNB by means of transport layer address(es) and/or authentication and/or security data contained into the determined downlink message.

The invention also offers a Mobility Management Entity (or MME), for an EPC connected to an LTE access network comprising eNBs, arranged, when it receives a chosen message including at least one transport layer address of a first eNB and/or authentication and/or security data of this first eNB, for relaying within a downlink message, an identifier of this first eNB and this at least one transport layer address and/or these authentication and/or security data for the connection of this first eNB to a set of at least one chosen eNB.

An embodiment of an MME according to the invention may include additional characteristics considered separately or combined, and notably:

it may be arranged for transmitting the downlink messages in the form of a MME CONFIGURATION UPDATE message or a S1 SETUP RESPONSE message or a downlink information transfer message;

it may be arranged for defining the set of chosen eNB(s) from eNBs belonging to a tracking area to which also belongs the first eNB;

it may be arranged for defining a set of chosen eNB(s) from eNBs belonging to a tracking area to which also belongs the first eNB and to at least one other tracking area;

it may be arranged for defining the set of chosen eNB(s) from eNBs belonging to a pool area to which also belongs the first eNB;

it may be arranged, when a chosen message further includes a list of identifiers of cells, for relaying within a downlink message this list of cell identifiers to the set of chosen eNB(s).

Further embodiments of the invention also offer an evolved Node B (or eNB), for an LTE access network, arranged, when it receives at least one transport layer address and/or authentication and/or security data and/or a list of cell identifiers and an associated first eNB identifier within a message, to locally store them for at least a limited duration of time in order to use them to establish a connection towards this first eNB.

BRIEF DESCRIPTION OF THE DRAWINGS

Other features and advantages of the invention will become apparent on examining the detailed specifications hereafter and the appended drawing of FIG. 1, wherein the unique FIGURE schematically illustrates a part of an example of network configuration comprising a MME according to the invention controlling three tracking areas.

The appended drawing may serve not only to complete the invention, but also to contribute to its definition, if need be.

DETAILED DESCRIPTION

The invention offers methods and associated Mobility Management Entities (or MMEs) for automatically configuring addresses between (evolved) Node Bs (or eNBs) of an LTE access network.

The unique FIGURE schematically illustrates a part of an LTE access network (also called E-UTRAN) comprising several base stations called eNBs (evolved Node Bs) NBi (i>0). Each eNB NBi controls at least one cell Ck (k>0) associated to a cell identifier called "global cell id", and each belonging to a tracking area TAj (here j=1 to 3, but j can take any value greater than 0) associated to a tracking area code (or TAC). In the control plane, each eNB NBi is connected to at least one MME of a core network, called EPC ("Evolved Packet Core") and connected to the E-UTRAN.

A Mobility Management Entity (or MME) of the EPC controls at least one tracking area TAj of a pool area. In the non limiting unique FIGURE only one MME has been illustrated, but an EPC may comprise several MMEs, and one of these MMEs may be a master. The user plane is not shown in the unique FIGURE.

At least one Mobility Management Entity (or MME) of the EPC is used to relay (or deliver) chosen configuration information (for configuring addresses) between its eNBs, NBi.

One embodiment of a method according to invention comprises two main steps.

A first step comprises receiving a chosen message concerning at least one new cell Ck at at least one Mobility Management Entity (or MME). One means here by "new cell" a cell Ck which has been newly defined or introduced or else started in an E-UTRAN, and which is controlled by a eNB hereafter called first eNB NB1.

According to an embodiment of the invention a chosen message includes at least one (i.e. one or several) transport layer address (or TLA) of a first eNB NB1 (controlling at least one new cell Ck) and/or authentication and/or security data of this first eNB NB1 for (SCTP) connection to the latter (NB1). So, a chosen message comprises either at least one transport layer address of a first eNB NB1, or authentication and/or security data of a first eNB NB1, or else both at least one transport layer address of a first eNB NB1 and authentication and/or security data of this first eNB NB1.

A transport layer address of a first eNB NB1 is a mandatory information when another node of an LTE access network wants to establish a (SCTP) connection with this first eNB NB1.

Authentication and/or security data are new configuration information which may be contained for security purpose into a message that an LTE access network node transmits to a first eNB, NB1, when the LTE access network node wants to establish a (SCTP) connection with it. Indeed this new configuration information could be indispensable for a first eNB NB1 for authorizing a new (SCTP) connection establishment with it. More precisely, this configuration information could be transmitted to a eNB NB1 by a second eNB NB2, and locally used by this first eNB NB1 for comparison with locally stored corresponding data or for computing auxiliary data to be compared with locally stored data, in order to decide if a new (SCTP) connection can be authorized.

The configuration information contained into a chosen message may be dedicated to X2 establishment of connection to the corresponding first eNB NB1.

It is important to note that an eNB could be associated to a single or to several (at least two) transport layer addresses intended for (X2) connection with several eNBs NBi or in case it would be temporarily impossible to establish a (X2) connection with a first address of a first eNB NB1, for instance. So, it may be of interest to include several transport layer addresses of a first eNB NB1 within a chosen message.

For instance a chosen message can be generated by a first eNB NB1 once at least one cell Ck it controls has been newly defined or introduced or else started. In this case the chosen message is an uplink message that is transmitted by the first eNB NB1 to at least one MME of the EPC connected to its E-UTRAN (see arrow F1 in the non limiting unique FIGURE).

A chosen message is preferably a setup request message. For instance, a chosen message can be the S1 SETUP REQUEST message (defined by the S1 Application Protocol (or S1AP)) originating from a first eNB NB1. It is recalled that the S1 SETUP REQUEST message is an uplink message that is generated by an eNB when it is started with at least one cell in operation in order that the tracking area code (or TAC) supported by this cell be declared and then registered in the MME. It is also recalled that the S1 SETUP REQUEST message normally require an acknowledge receipt.

A chosen message may be also a so-called S1AP ENB CONFIGURATION UPDATE message (which also may require acknowledgement).

It is important to note that in case where a S1 SETUP REQUEST (or an ENB CONFIGURATION UPDATE) message is used as chosen message, such messages include at least one additional (and new) field dedicated to the transport layer address(es) and/or authentication and/or security data concerning a first eNB NB1.

But, to avoid format and service modifications of S1 SETUP REQUEST (or ENB CONFIGURATION UPDATE) message and/or an unnecessary acknowledge receipt, a chosen message may be also a dedicated (uplink) message which is transmitted by a first eNB NB1, possibly after itransmission of a S1 SETUP REQUEST message for registering new cell(s) Ck. This dedicated message is an uplink message of a new type (possibly a S1 uplink message) which may be called uplink information transfer message, for instance.

It is also important to note that a transmitted chosen message further contains an identifier of the first corresponding eNB NB1.

A second method step of an exemplary embodiment comprises relaying (or distributing) within a downlink message an identifier of a first eNB NB1 (that is identified by a transmitted chosen message) and the configuration information relative to this first eNB NB1 (contained into this transmitted chosen message) for (X2) connection to this first eNB NB1 to a set of at least one chosen eNB NBi.

In other words the Mobility Management Entity (or MME) is modified so that each time it receives a chosen message, such as the one described above (i.e. including at least one transport layer address of a first eNB NB1 and/or authentication and/or security data of this first eNB NB1), it relays within a downlink message an identifier of this first eNB NB1 and the transport layer address(es) and/or authentication and/or security data contained into the received chosen message to one or more chosen eNBs NBi.

This downlink message can be a S1AP MME CONFIGURATION UPDATE message transmitted through a secure S1 connection, for instance. The downlink message could be also a dedicated downlink message of a new type which may be called downlink information transfer message, for instance.

It is important to note that in case where a MME CONFIGURATION UPDATE message is used as downlink message it needs to include at least one additional (and new) field dedicated to the first eNB identifier and its transport layer address(es) and/or authentication and/or security data.

It may be left up to the MME to decide the range of surrounding eNBs NBi to which it must transmit a downlink message. Such range may be to every eNB serving the tracking areas controlled by the MME (or the MME pool to which the MME belongs), or to one or more (possibly every except NB1) eNBs belonging to a tracking area TA1 to which also belongs the concerned first eNB NB1, or else to one or more (possibly every except NB1) eNBs belonging to the first eNB tracking area TA1 and to every eNB of at least one other tracking area TAj (with j≠1).

Another tracking area TAj (with j≠1) may be a neighbouring tracking area TAj of the first eNB NB1.

It is important to note that the set of chosen eNB(s) may possibly include the full pool area that is served by the first eNB NB1.

The smaller the range (e.g. only the first eNB tracking area TA1), the lower the signalling involved. This situation, where the set of addressees of a downlink message concerning a first eNB NB1 only comprises eNB NBi belonging to the tracking area TA1 of this first eNB NB1, corresponds to a majority of cases.

In the non limiting unique FIGURE, arrows F2 represent the transmission of a downlink message between the MME and several eNBs NBi of the first eNB tracking area TA1, and arrows F2' represent the transmission of a downlink message between the MME and several eNBs NBi of tracking areas TA2 and TA3 surrounding the first eNB tracking area TA1.

When the MME must transmit a downlink message to eNBs NBi belonging to another tracking area TAj (j≠1) which is a neighbouring tracking area of a first eNB tracking area TA1, it needs to know the identifier (and more precisely the Tracking Area Code (or TAC)) of this neighbouring tracking area TAj. This code (TAC), identifying a neighbouring tracking area TAj (j≠1) of a first eNB tracking area TA1, can be deduced by the MME from the code (TAC) of this first eNB tracking area TA1 received during the S1 setup procedure or can be contained in a chosen message.

The MME may not store the configuration information received within the chosen messages. In such an instance, the MME aims mainly at relaying (or distributing) this received configuration information to a set of chosen eNBs NBi. However, the use of the downlink S1 SETUP RESPONSE message may allow the MME to report to an eNB NBi (i≠1) all the first eNB transport layer addresses for which that eNB NBi should be part of the set of chosen eNB NBi, in which case the configuration information received in the chosen message would need to be stored in the MME to be used during subsequent S1 Setup procedures. In the case where the S1 SETUP RESPONSE message is used as downlink message, it needs to include at least one additional (and new) field dedicated to each first eNB identifier and its transport layer address(es) and/or authentication and/or security data.

Each eNB NBi receiving a downlink message may store the configuration information relative to a first eNB NB1 contained/identified in the downlink message. Depending on the configuration of a receiving eNB NBi, this configuration information may or may not be stored for further use. The duration of the configuration information storage can also depend on the eNB configuration (it can be only for a limited duration during which the new cell(s) Ck concerned by a chosen message and the corresponding downlink message is (are) likely to be detected by an user equipment UE after a corresponding S1 Setup procedure).

If a (second) eNB NB2 is informed by a user equipment UE of the existence of a new cell Ck, it has at its disposal the cell identifier (global cell id) of this new cell Ck, but it does not know a transport layer address of the first eNB controlling this new cell Ck. So, two situations may occur.

In a first situation, the second eNB NB2 does not store any configuration information relative to the first eNB NB1 controlling this new cell Ck. This may occur if the second eNB NB2 has not received this configuration information in a downlink message or if the configuration information is no longer locally stored because its storage duration has expired, for instance. In this situation an existing default mechanism can be used. Such existing default mechanism may consist in a DNS look-up or in another proprietary look-up.

In a second situation, the second eNB NB2 stores configuration information relative notably to the first eNB NB1 controlling the new cell Ck. So the second eNB NB2 has to find this configuration information from the received cell identifier. For this purpose, the second eNB NB2 can be configured in order to apply a fixed mask on the received cell identifier in order to determine the identifier of the corresponding first eNB NB1, which may possibly be in its tracking area TA1. For instance, in case where the global cell id comprises 28 bits, the corresponding (first) eNB identifier (or global eNB id) may comprise the first 24 bits of this global cell id. So, once the second eNB NB2 has deduced a first eNB identifier from a received cell identifier it can determine a transport layer address of the corresponding first eNB NB1, which is locally stored. It is recalled that the second eNB NB2 locally stores first eNB identifiers in correspondence with transport layer address(es) and possible authentication and/or security data. Then, the second eNb NB2 can initiate a connection establishment with this first eNB NB1 by means of one of its transport layer addresses and possibly the corresponding authentication and/or security data.

If there is no direct correspondence between first eNB identifiers and received cell identifiers, then each chosen message must further include the list of identifiers of the cells that are controlled by the concerned first eNB NB1, and such a list must be relayed by the MME within the corresponding downlink message to the set of chosen eNB(s) NBi. So, when a second eNB NB2 has received a cell identifier representative of a new cell Ck controlled by a first eNB NB1 from a user equipment UE, it has to determine amongst the locally stored configuration information (initially contained into the received downlink messages) the one comprising this received cell identifier. Then, the second eNB NB2 can determine a transport layer address of the corresponding first eNB NB1 which is locally stored in correspondence with this cell identifier. Then, a connection establishment can be initiated with this first eNB NB1 by means of one of its transport layer addresses and possibly the corresponding authentication and/or security data.

The invention is not limited to the embodiments of method and Mobility Management Entity described above, which are provided only as examples, but encompasses all alternative embodiments which may be considered by one skilled in the art within the scope of the claims hereafter.

The invention claimed is:

1. A method of configuring the address(es) between evolved Node Bs of a Long Term Evolution (LTE) access network, the method comprising:
receiving a chosen evolved Node B address configuration message at at least one Mobility Management Entity connected to the LTE access network, the chosen evolved Node B address configuration message concerning at least one cell controlled by a first evolved Node B and having been newly defined or newly introduced or newly started, the chosen evolved Node B address configuration message including at least one transport layer address of the first evolved Node B or authentication data or security data of the first evolved Node B for connection to the first evolved Node B, and relaying an identifier of the first evolved Node B and the at least one transport layer address or authentication data or security data for the connection to the first evolved Node B within a downlink evolved Node B address configuration message from the Mobility Management Entity to a set of at least one chosen evolved Node B.

2. The method according to claim 1, wherein the chosen evolved Node B address configuration message is a setup request message.

3. The method according to claim 2, wherein the setup request message is a S1 SETUP REQUEST message originating from the first evolved Node B.

4. The method according to claim 1, wherein the chosen evolved Node B address configuration message is a dedicated message received from the first evolved Node B.

5. The method according to claim 4, wherein the dedicated message is received from the first evolved Node B after reception of a S1 SETUP REQUEST message.

6. The method according to claim 1, wherein the at least one transport layer address or authentication data or security data is for X2 establishment of connection to the first evolved Node B.

7. The method according to claim 1, wherein the downlink evolved Node B address configuration message is at least one of a MME CONFIGURATION UPDATE message, a S1 SETUP RESPONSE message and a dedicated downlink information transfer message.

8. The method according to claim 1, wherein the set of chosen evolved Node B(s) includes at least one evolved Node B that belongs to a tracking area to which the first evolved Node B also belongs.

9. The method according to claim 8, wherein the set of chosen evolved Node B(s) further includes at least one evolved Node B that belongs to at least one other tracking area.

10. The method according to claim 8, wherein when a second evolved Node B has received a cell identifier representative of a new cell controlled by the first evolved Node B from a user equipment, applying by the second evolved Node B a fixed mask on the received cell identifier to determine the identifier of the first evolved Node B and then initiating a connection establishment with the first evolved Node B by means of the at least one transport layer address or authentication data or security data contained in a received downlink evolved Node B address configuration message comprising the determined identifier of the first evolved Node B.

11. The method according to claim 8, wherein the chosen evolved Node B address configuration message further includes a list of identifiers of cells that are controlled by the first evolved Node B, and the method further comprises relaying within the downlink evolved Node B address configuration message the list of cell identifiers to the set of chosen evolved Node B(s), and wherein when a second evolved Node B has received a cell identifier representative of a new cell controlled by the first evolved Node B from a user equipment, determining by the second evolved Node B among received downlink evolved Node B address configuration messages the one comprising the received cell identifier and then initiating a connection establishment with the corresponding first evolved Node B by means of the at least one transport layer address or authentication data or security data contained in the one determined downlink evolved Node B address configuration message.

12. The method of claim 1, wherein the chosen evolved Node B address configuration message includes the at least one transport layer address of the first evolved Node B, and wherein the downlink message includes the at least one transport layer address of the first evolved Node B.

13. A Mobility Management Entity for a core network connected to a Long Term Evolution access network comprising evolved Node Bs, wherein the Mobility Management Entity is arranged, in response to receipt of a chosen evolved Node B address configuration message concerning at least one cell controlled by a first evolved Node B and having been newly defined or newly introduced or newly started, the evolved Node B address configuration message including at least one transport layer address of the first evolved Node B or authentication data or security data of the first evolved Node B, to relay within a downlink evolved Node B address configuration message, an identifier of the first evolved Node B and the at least one transport layer address or authentication data or security data for the connection of the first evolved Node B to a set of at least one chosen evolved Node B.

14. The Mobility Management Entity according to claim 13, wherein the Mobility Management Entity is arranged to transmit the downlink evolved Node B address configuration message in the form of either a MME CONFIGURATION UPDATE message, or a S1 SETUP RESPONSE message or a dedicated downlink information transfer message.

15. The Mobility Management Entity according to claim 13, wherein the Mobility Management Entity is arranged to define the set of chosen evolved Node B(s) from evolved Node Bs belonging to a tracking area to which the first evolved Node B also belongs.

16. The Mobility Management Entity according to claim 15, wherein the Mobility Management Entity is arranged to define the set of chosen evolved Node B(s) from evolved Node Bs belonging to a tracking area to which the first evolved Node B also belongs and to at least one other tracking area.

17. The Mobility Management Entity according to claim 13, wherein the Mobility Management Entity is arranged, when the chosen evolved Node B address configuration message further includes a list of identifiers of cells, to relay the list of cell identifiers within the downlink evolved Node B address configuration message to the set of chosen evolved Node B(s).

18. The Mobility Management Entity of claim 13, wherein the chosen evolved Node B address configuration message includes the at least one transport layer address of the first evolved Node B, and wherein the downlink message includes the at least one transport layer address of the first evolved Node B.

19. An Evolved Node B for a Long Term Evolution (LTE) access network, the Evolved Node B being arranged, when the Evolved Node B receives at least one transport layer address or authentication data or security data or a list of cell identifiers and an associated identifier of a first evolved Node B controlling at least one cell having been newly defined or newly introduced or newly started within a downlink evolved Node B address configuration message from a Mobility Management Entity, to locally store the at least one transport layer address or authentication data or security data or list of cell identifiers and associated identifier of the first evolved Node B for at least a limited duration of time in order to use the at least one transport layer address or authentication data or security data or list of cell identifiers and associated identifier of the first evolved Node B to establish a connection towards the first evolved Node B.

20. The Evolved Node B of claim 19, wherein the Evolved Node B is arranged to establish an X2 connection to the first evolved Node B.

21. The Evolved Node B of claim 19, wherein the Evolved Node B is arranged, in response to receipt of a cell identifier representative of a new cell controlled by another evolved Node B from a user equipment, to apply a fixed mask on the received cell identifier to determine the identifier of the other evolved Node B and to then initiate a connection establishment with the other evolved Node B by means of the at least one transport layer address or authentication data or security data contained in a received downlink evolved Node B address configuration message comprising the determined identifier of the other evolved Node B.

22. The Evolved Node B of claim 19, wherein the Evolved Node B is arranged, in response to receipt of a cell identifier representative of a new cell controlled by another evolved Node B from a user equipment, to determine among received downlink evolved Node B address configuration messages the one comprising the received cell identifier, and to then initiate a connection establishment with the corresponding other evolved Node B by the at least one transport layer address or authentication data or security data contained in the determined downlink evolved Node B address configuration message.

23. The Evolved Node B of claim 19, wherein the Evolved Node B receives and locally stores the at least one transport layer address of the first evolved Node B, and wherein the Evolved Node B uses the at least one transport layer address of the first evolved Node B to establish a connection towards the first evolved Node B.

* * * * *